Aug. 9, 1927.  
C. J. DALTON  
1,638,476  
TIRE REMOVER  
Filed March 29, 1923  
2 Sheets-Sheet 1

C. J. Dalton INVENTOR  
BY  
Thomas Howe ATTORNEY

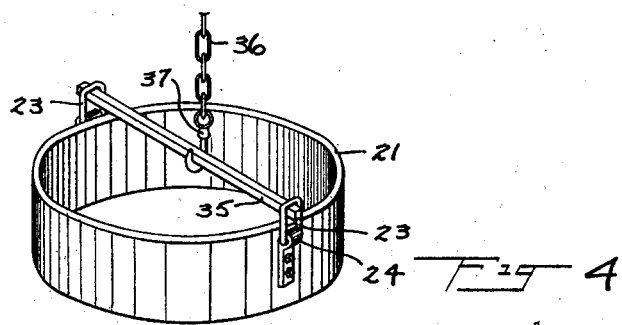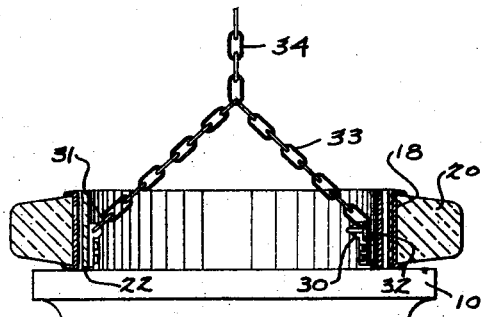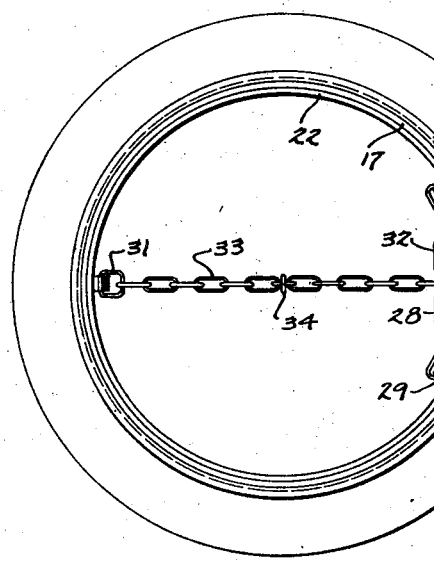

Patented Aug. 9, 1927.

1,638,476

UNITED STATES PATENT OFFICE.

CHARLES J. DALTON, OF NEW YORK, N. Y.

TIRE REMOVER.

Application filed March 29, 1923. Serial No. 628,474.

This invention relates to a method and means for removing truck tires from wheels.

It is an object of this invention to provide improved means whereby a truck tire may be readily and easily removed from the wheel.

A further object resides in means for contracting and at the same time lifting a ring used in the operation of removing a tire from the wheel.

Further objects will appear after a study of the following specification and appended claims taken in conjunction with the illustrative drawings forming this application and in which drawings—

Fig. 3 represents a perspective view in elevation of the upper ring showing the hoisting means applied thereto;

Fig. 4 represents a cross sectional view of the tire and tire rim after it has been removed from the wheel, together with the means for contracting and lifting the lower ring;

Fig. 5 represents a plan view of the tire rim and tire, together with the lower ring, showing the means for contracting and lifting the ring.

Figure 1:
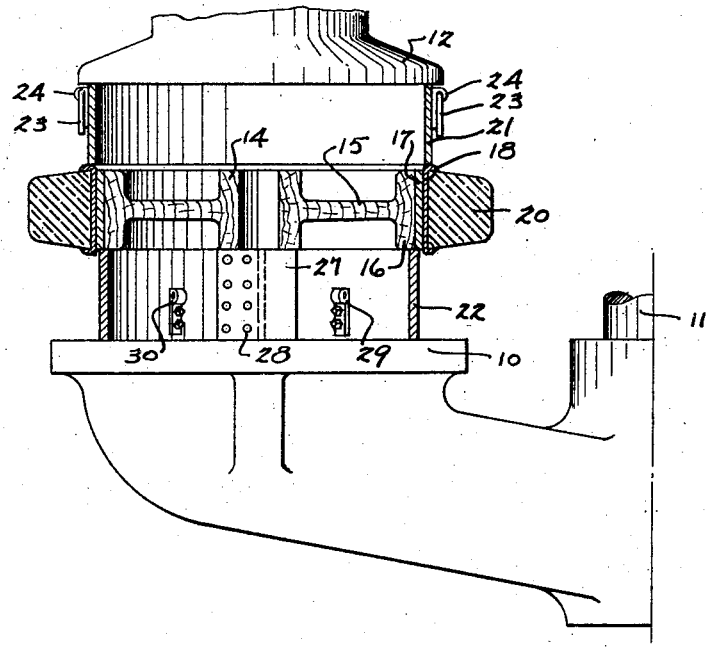
Figure 1 represents a side view in elevation; some of the parts being in such cross section as to show more clearly the position in which the wheel and the ring are placed prior to the removal operation.

In the removal of truck tires from the felloe band of a wheel much trouble and annoyance has been occasioned due to the fact that after the tire has been forced from the band onto a ring by pressure, a tedious operation must be gone through to remove the ring from the tire rim, necessitating the employment of several men to hammer on the rim, first on one side, and then the other until it is finally forced off.

The present invention has been devised whereby the above difficulty and annoyance are dispensed with, and tires may be removed from the wheels and new ones placed thereon in a much shorter time, with much less labor, and a lesser amount of trouble.

A platen 10 of a hydraulic press is adjustably secured to a standard 11 and on this a wheel may be placed. The plunger of the press is indicated by the numeral 12. The plunger is capable of reciprocation in a vertical plane with respect to the platen 10 by means of the usual hydraulic cylinder.

The wheel 13, of usual construction, comprises a wooden hub 14, spokes 15 and a felloe 16. A felloe band 17 tightly encircles the felloe 16. About the felloe band 17 is the tire band 18 on which is mounted the rubber tread 20 in the well known manner.

In the tire removing apparatus two metal rings 21 and 22 are employed. The ring 21 is of suitable circumference to rest upon the tire rim 18. Two links 23, diametrically opposed on the periphery of the ring 21, are pivotally mounted in the brackets 24.

The ring 22 is split and the ends 25 and 26 thereof are oppositely beveled. A metal strip 27, secured to one end of the ring by rivets 28, covers the ends and provides a guide therefor when the ring is contracted or expanded.

Mounted on the inside of the ring 22 are brackets 29, 30 and 31. The brackets 29 and 30 are secured adjacent the beveled ends 25 and 26, while the bracket 31 is diametrically opposed to and midway of a line connecting the brackets 29 and 30 on the opposite side of the ring.

Holes are provided in the brackets 29 and 30 to which links of a chain 32 may be attached. A chain 33 is linked at one end to the central portion of the chain 32, and to the bracket 31 at the other end. Midway of the chain 33 is attached another chain 34, which is secured at its other end to any suitable hoisting means (not shown) as a crane.

A metal rod 35 is adapted to be placed through the links or loops 23 to enable the ring 21 to be lifted. A chain 36 provided with a hook 37 at one end is employed to lift the ring 21, the chain and ring being lifted by suitable hoisting means.

When it is desired to remove a tire from a wheel, the tired wheel will first be laid upon the ring 22, as shown in Figure 1. The ring 22 being so placed as to be directly under the point of engagement of the felloe 16 with the felloe ring 17. The ring 21 is then placed over the tire rim 18.

Figure 2:
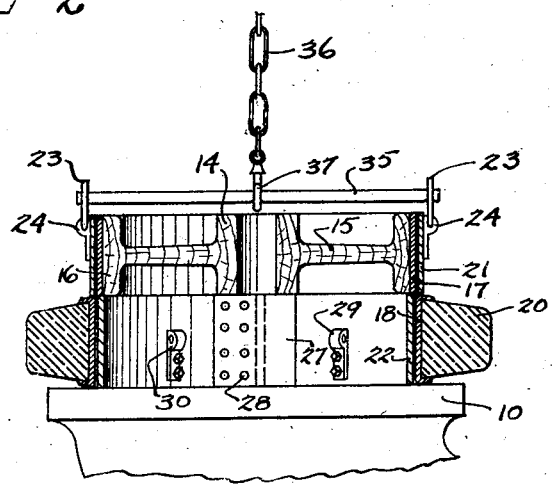
Fig. 2 represents a cross-sectional view in elevation showing the relative arrangements of the parts after the tire has been removed.

The plunger of the hydraulic press is then forced downwardly and, as will be readily seen, the tire rim and tire will be forced from the wheel, as shown in Figure 2. The rod 35 is then inserted through the loops 23, the hook 37 engaged with the rod, and the chain may then be raised, thereby lifting the ring 21. This can be done in view of the fact that the diameter of the ring 21 is slightly greater than the diameter of the ring 17.

Thereafter the chain 34 will be raised and in so doing the split ring 22 will be both contracted and lifted out of the tire rim 18. Thus, it will be observed, that truck tires can be readily and easily removed from the wheel by one person, enabling him to do the work which formerly required two or three men, and in much less time.

While the invention has been illustrated in what is considered its best application it may have other embodiments without departing from its spirit and is not therefore limited to the structure shown in the drawings.

What I claim is:

1. In a device for removing tires from wheels, in combination, two metallic rings of unequal circumference one of said rings being split, said split ring provided with a plurality of brackets, cables attached to said brackets, means for applying a lifting force to one of said cables, whereby said split ring may be simultaneously contracted and lifted.

2. In a device for removing a tire from a wheel, in combination, a metallic ring of practically the same circumference as the tire rim, means adapted to be attached to said ring for lifting the same, a second ring of slightly less circumference than said tire rim, said last mentioned ring being split, means for applying pressure to said first mentioned ring, whereby said tire may be removed, and means for simultaneously contracting and lifting said split ring after the tire has been removed.

3. The combination with an annular member adapted to bear against the tire of a wheel, of a second annular member of smaller diameter than the first and adapted to bear against the wheel within the tire, said second member being collapsible and means for forcing said members towards each other whereby the wheel enters within the first mentioned member and said second member enters within the tire, and a common means for lifting and collapsing said second member.

In testimony whereof I have signed this specification this 22nd day of September, 1922.

CHARLES J. DALTON.